United States Patent [19]

Lanter

[11] 3,928,652

[45] Dec. 23, 1975

[54] METHOD OF PREPARING A FISH PRODUCT

[75] Inventor: Kent J. Lanter, Belleville, Ill.

[73] Assignee: Ralston Purina Company, St. Louis, Mo.

[22] Filed: May 6, 1974

[21] Appl. No.: 466,925

Related U.S. Application Data

[63] Continuation-in-part of Ser. No. 367,284, June 5, 1973, abandoned.

[52] U.S. Cl. .................................. 426/643; 426/656
[51] Int. Cl.² ......................................... A23L 1/325
[58] Field of Search ............. 426/89, 212, 224, 274, 426/364, 371, 376, 382, 574, 629, 643, 656

[56] References Cited
UNITED STATES PATENTS

| 2,830,902 | 4/1958 | Anson et al. | 426/89 |
| 3,482,998 | 12/1969 | Carroll et al. | 426/371 |
| 3,617,307 | 9/1975 | Inklaar | 426/224 X |

Primary Examiner—A. Louis Monacell
Assistant Examiner—R. A. Yoncoskie
Attorney, Agent, or Firm—Virgil B. Hill

[57] ABSTRACT

This invention relates to a method of forming a fish product and particularly a product resembling a grated 100 percent tuna product from tuna flesh and synthetic protein filaments. The protein filaments are chopped to lengths of about 0.125 – 0.375 inches prior to being blended with tuna flesh and the liquid content (oil or water) of the protein filaments is controlled within the critical range of 75 – 85 percent prior to or as they are being blended with the tuna flesh. The mixture may then be passed through a grating machine or the protein filaments may be blended with the tuna after the tuna has been grated. The mixture is then placed in a can and retorted to form a product substantially resembling a grated 100 percent tuna product in texture and consistency.

8 Claims, No Drawings 3,928,652

METHOD OF PREPARING A FISH PRODUCT

BACKGROUND OF THE INVENTION

This application is a continuation-in-part application of our previous application Ser. No. 367,284 filed June 5, 1973 now abandoned. Edible protein fibers produced from secondary protein sources such as vegetable proteins, by-product proteins, and microbial proteins are well known in the art. U.S. Pat. Nos. 2,682,466; 3,488,770; and 2,142,571 disclose methods of producing known edible protein fibers. Typically, the fibers produced by the known methods have been used to supplement or replace primary sources of protein in the diet of humans and animals. For example, the secondary protein has been used to prepare synthetic cuts of meat as disclosed in U.S. Pat. No. 2,682,466 or to prepare chunks of protein fiber for use in soups and sauces or to be mixed with meat to form patties. Additionally, U.S. Pat. Nos. 3,662,671 and 3,662,672 disclose methods of forming protein filaments which may be used as a meat extender.

SUMMARY OF THE INVENTION

Typically, the method of utilizing formed protein fibers in food structures such as synthetic meat cuts, soup chunks, and meat patties requires the use of a binder or adhesive to retain the fibers in the food structure. I have discovered a method of producing edible protein food products using edible synthetic secondary protein fibers or filaments which does not require the addition of supplemental binders or adhesives. The food substances produced by the present method have a greatly enhanced structure and texture as well as structural integrity to substantially resemble a grated 100 percent tuna product. Further, by controlling the liquid content of the fibers within a very narrow range prior to or during the blending of the fibers with the tuna flesh, it is possible to uniformly pack the product, and subject it to retorting without scorching or burning the product or causing the product to become mushy.

The improvement in structure and texture achieved by the present method enables applicant to utilize a wide variety of protein sources to supplement tuna flesh in a grated tuna product without substantially altering the final structure or texture of the product. Also, by following the critical sequence of steps of the present process, presently used packing equipment may be utilized without modification. These protein sources are those which, though providing good quality protein and flavor, have heretofore been unacceptable due to their lack of sufficient texture. For example, sources of protein such as soy or scrap tuna flesh may be utilized.

I am able to obtain the desired texture and structural integrity of the grated tuna product using supplemental protein filaments without using supplemental binders by using a protein fiber within a controlled size and a controlled liquid content in the food system. Desirably, the food product is formed using the protein filaments by chopping the filaments into discrete particles and controlling the liqud content thereof within the range of about 75 – 85 percent by weight and then blending the particles with tuna flesh and grating the mixture to form the prepared product. The prepared product may then be packed in a can and retorted with the final product having a texture and consistency resembling a grated 100 percent tuna product, i.e. the product is not formed into a coherent mass but is granular in structure and readily breaks apart. The supplemental protein source need not be completely homogenized to be used in the food system, but may still retain some of its natural fibrous characteristics.

The food products formed may incorporate from 1 to 60 percent by weight (dry weight) of the edible heat setting synthetic protein fibers. Typically, the product will contain from about 15 to 45 percent dry weight of the heat setting fibers, and from about 85 to 55 percent by weight solids content of the tuna flesh. Additionally, the final product may contain from about 0 – 6 percent spices added oil and/or water.

The food products are formed by producing the particle size of the filaments so that substantially all of the particles have a length of about 0.125 – 0.375 inches. The liquid content of the filaments is controlled within the range of 75 – 85 percent by weight prior to or during the blending thereof with the tuna flesh, and after the grating of the mixture the product is placed in cans and retorted. The control of the liquid content of the filaments within the range of 75 – 85 percent does not include the fill oil or water which is normally added to the can after the tuna is packed therein. This fill oil and/or water is typically about 10 – 15 grams. The retorting or heat treatment sets the heat settable fibers and tuna flesh to a granular structure which permits the product to be readily separated or broken apart.

DESCRIPTION OF THE PREFERRED EMBODIMENTS

I have found that if semi-polymerized or heat settable fibers prepared as described in U.S. Pat. Nos. 3,662,672 and 3,662,671 are used the most desirable grated tuna-type product is formed and these patents are incorporated herein by reference to describe the protein filaments and method of making same. Desirably, the filaments used herein will either be produced from soy protein or from a mixture of soy protein and tuna flesh as described in the above mentioned patents.

The heat setting fibers may be utilized as described herein to form a grated tuna-type product without forming a coherent food structure but rather forming a granular structure which readily falls apart. As used herein the liquid content of the filaments shall mean the quantity of material which is adsorbed or absorbed by the filaments and in the usual sense shall mean the quantity of vegetable broth, water or oil added to the filaments.

Forming the food product should follow a critical combination of steps to obtain the desired characteristics. Typically, the fibers are chopped to a desired length which is sufficient to permit the fibers to be blended with the tuna flesh and still obtain a final product with a granular structure. Preferably, substantially all of the filaments will have a length of about 0.125 – 0.375 inches and have a diameter of about 0.15 inches although smaller diameters may be used. Filaments having a diameter of greater than 0.015 inches or less than 0.006 inches should not be used since filaments which are too large or small produce a product which does not have the desired appearance. The liquid content of the chopped filaments is controlled within the narrow range of 75 – 85 percent by weight. This liquid content of the filaments may be adjusted or controlled prior to blending the filaments with the tuna flesh or during the blending thereof. If the fibers have a liquid content of less than 75 percent, the subsequent blending of the fibers with the tuna flesh results in a somewhat fluffy product such that difficulty is encountered in attempting to pack the product into a can. Also, when a low liquid content of the fibers is used, the subsequent retorting of the canned product results in the scorching or burning of the product. If the liquid content of the fibers is greater than 85 percent when blended with the tuna flesh, the final product when retorted has a tendency to become spongy or mushy in texture. Additionally, it should be understood that the liquid content of the fibers may be adjusted to the critical range of 75 – 85 percent by weight by adding water and/or oil, such as soybean oil. If desired, the liquid content of the filaments may be adjusted to the range of 75 – 85 percent by weight prior to the chopping thereof, however, it is preferred that the chopping operation be performed initially. The liquid content of 75 – 85 percent by weight of the filaments must have a minimum of approximately 45 percent by weight of the filaments as water with the remaining liquid content of approximately 30 – 40 percent by weight of the filaments being oil and/or water. This minimum of approximately 45 percent by weight water in the liquid content of the filaments is necessary since sufficient oil will not be absorbed or adsorbed by the filaments to attain the critical liquid content if less water is utilized. It should be understood that the liquid content of the filaments within the range of about 75 – 85 percent does not include the fill oil or water which is normally added to the can after the tuna is packed therein. If desired the filaments or fibers may be dyed to obtain a desirable color in the final product.

The tuna flesh with which the protein filaments are blended is obtained in the form of scraps or by-products of a cannery operation, i.e., the residual tuna flesh after the whole tuna has been precooked and the loins and bloodmeat removed. Of course, the loins could be used in the present invention, however, from an economic standpoint this is normally not desirable. Also, it is possible to blend the protein filaments with the tuna flesh after the tuna has been grated, however, it is desirable to blend the filaments with the tuna flesh prior to the grating thereof. The protein filaments may be present in a range from about 1 – 60 percent and preferably in the range of about 15 – 45 percent by weight of the mixture. If greater than 60 percent by weight protein filaments are included in the final product, it has a tendency to become tough and not have the desired granular structure.

The mixture is then passed through a standard grating machine to reduce the tuna flesh to the desired size. If the fibers were not chopped prior to the grating thereof, the tuna flesh would be masticated before the filaments would be reduced to desired size such that a final product having the desired granular structure would not be obtained. This is due to the filaments being tougher than the tuna flesh and not as readily reduced in size.

The grated mixture is then packed into cans and processed in the normal manner, i.e. oil or water is added for fill weight, the cans sealed and then retorted, typically for 55 minutes at 15 psi. The final product when removed from the can following retorting exhibits a structure and texture substantially similar to a grated 100 percent tuna product.

The following examples are illustrative of the process and food product embodying the present invention.

EXAMPLE 1

A dried soy protein isolate obtained from the Ralston Purina Company under the trade name of Edi-Pro A was slurried with water, the pH of the slurry was adjusted to 5.2 with sodium hydroxide at a solids content of 25 percent by weight. The protein purity of the solids was about 95 percent. The slurry was pumped at a pressure of about 1500 psig through a four coil heat exchanger made of 80 ft. of ⅜ inch × 0.209 ID seamless, stainless steel tubing in a 6 inch pipe. The temperature of the heat exchanger was set at 300°F. The slurry passed through the heat exchanger and was expelled through a nozzle having a plurality of 0.15 inch openings therein. The fibers were cooled and collected in water in the manner described in assignee's copending United States patent application, Ser. No. 302,265, entitled "Method of Cooling and Collecting Protein Fibers" filed Oct. 30, 1972 now abandoned. The fibers were recovered and the excess moisture was removed by centrifuging. The fibers as recovered have a moisture content of about 63 – 67 percent by weight. The fibers were chopped in a Hobart silent grinder for approximately 10 minutes. Substantially all of the fibers had a length of about 0.125 – 0.375 inches. The chopped filaments were blended with grated tuna flesh for about 15 seconds. During the blending, water and vegetable oil were added to adjust the liquid content of the filaments to about 75 percent. The mixture was placed in cans, approximately 15 gms of vegetable oil added, the cans sealed and retorted for 55 minutes at 15 psi. The product was opened and had a structure substantially similar to a grated 100% tuna product, i.e. it had a granular structure and readily breaks apart.

The tuna flesh and filaments were blended in the following proportions and instrom readings of the mixture taken.

| % Filaments of Mixture Dry Weight | Instrom Reading 1" Cube |
|---|---|
| Control | 83 |
| 15 | 56 |
| 30 | 84 |
| 45 | 139 |
| 60 | 154 |

As can be seen the greater the quantity of filaments used in the product, the tougher the product becomes.

EXAMPLE 2

Filaments were prepared and blended with tuna flesh in accordance with Example 1 in the proportion of 370 gms tuna flesh and 180 gms protein filaments. During the blending of this mixture various levels of water were added to control the liquid content of the filaments. As a control, no water was added to the mixture, the filaments normally having a moisture content of approximately 65 percent by weight, and the mixture was placed in a can, approximately 15 grams of fill water added, the can sealed and retorted for 55 minutes at 15 psi. The product when removed from the can was scorched or burnt and would not be satisfactory as a grated tuna-type product. Further, difficulty was encountered in attempting to pack the mixture into a can due to the fluffy or low density character of the blended mixture. Water was added to the mixture as it was being blended in quantities of: sample A-70 gms (fiber liquid content approximately 75 percent); B-100 gms (fiber liquid content approximately 78 percent) and C-150 gms (fiber content approximately 82 percent). The samples all had approximately 15 grams of fill water added, were canned and retorted with the control product. The product of samples A, B, and C had a structure substantially similar to a grated 100 percent tuna product, i.e., was not burnt or scorched and had a granular structure and readily broke apart.

EXAMPLE 3

Filaments were prepared and blended with tuna flesh in accordance with Example 1 in the proportion of 370 gms tuna flesh and 180 gms protein filaments. The liquid content of the filaments was controlled as follows:

| Sample | Liquid Content % By Weight of Filaments | | | Final Product Appearance |
|---|---|---|---|---|
| | Total | Oil | Water | |
| 1 | 80 | | 80 | Good with granular structure no excess liquid |
| 2 | 80 | 15 | 65 | Good with granular structure no excess liquid |
| 3 | 80 | 35 | 45 | Good with granular structure no excess liquid |
| 4 | 80 | 45 | 30 | Crunchy or brittle texture with excess oil in can when opened and would not be satisfactory product. |

The products prepared with filaments having a minimum of 45 percent by weight of the filaments as water resulted in satisfactory products having a texture substantially similar to a grated 100 percent tuna product.

From the foregoing it is now apparent that applicant has described a unique method of forming a product resembling 100 percent grated tuna from tuna flesh and protein filaments meeting the objects and advantages set out hereinbefore and that obvious modifications may be made from the method set forth herein for purposes of illustration without departing from the spirit of the invention.

I claim:

1. A method of forming a grated tuna-type product from tuna flesh and protein filaments comprising the steps of: preparing heat settable synthetic protein filaments, chopping the heat settable filaments into discrete particles, substantially all of which have a length of less than about ⅜ inches, adjusting the liquid content of the discrete particles to about 75 – 85 percent by weight and forming a mixture of said adjusted particles with tuna flesh, the discrete particles being present in a range from 1-60 percent by weight of the mixture; grating the mixture, placing the grated mixture into cans and retorting the mixture to provide a tuna-type product.

2. The method according to claim 1 wherein the protein filaments are about 15 – 45 percent by weight of the mixture.

3. The method according to claim 1 wherein substantially all of the discrete particles of protein filaments have a length of approximately ⅛ – ⅜ inches.

4. A method of forming a food product from tuna flesh and protein filaments comprising the steps of: preparing heat settable synthetic protein filaments, controlling the liquid content of the filaments within the range of about 75 – 85 percent by weight, chopping the heat settable filaments into discrete particles substantially all of which have a length of less than ⅜ inches, forming a mixture of said discrete particles with tuna flesh in a range from 1-60% by weight of the mixture, grating the mixture, placing the grated mixture into a can and retorting the mixture to form a grated tuna-type product.

5. The method according to claim 4 wherein the protein filaments are about 15 – 45 percent by weight of the mixture.

6. A method of forming a grated tuna-type product from tuna flesh and protein filaments comprising the steps of: preparing heat settable synthetic protein filaments, chopping the heat settable filaments into discrete particles substantially all of which have a length of less than ⅜ inches, forming a mixture of said discrete particles with tuna flesh which has been grated while adding sufficient liquid to adjust the liquid content of the discrete particles to about 75 – 85 percent by weight with a minimum of approximately 45 percent by weight of the filaments being supplied by water, the discrete particles being present in a range from 1-60 percent by weight of the mixture, placing the mixture into a can and retorting the mixture to form a grated tuna-type product which has a texture which readily breaks apart.

7. The method according to claim 6 wherein the protein filaments are about 15 – 45 percent by weight of the mixture.

8. The method according to claim 7 wherein substantially all of the discrete particles of protein filaments have a length of approximately ⅛ to ⅜ inches.

* * * * *

UNITED STATES PATENT AND TRADEMARK OFFICE
CERTIFICATE OF CORRECTION

PATENT NO. : 3,928,652
DATED : December 23, 1975
INVENTOR(S) : Kent J. Lanter

It is certified that error appears in the above–identified patent and that said Letters Patent are hereby corrected as shown below:

Column 2, line 14, "producing" should read --reducing--

Signed and Sealed this eighteenth Day of May 1976

[SEAL]

Attest:

RUTH C. MASON
Attesting Officer

C. MARSHALL DANN
Commissioner of Patents and Trademarks